United States Patent
Rangaswamy et al.

(10) Patent No.: US 7,392,930 B2
(45) Date of Patent: Jul. 1, 2008

(54) IRON-BASED BRAZE FILLER METAL FOR HIGH-TEMPERATURE APPLICATIONS

(75) Inventors: Subramaniam Rangaswamy, Rochester Hills, MI (US); Dientje J. Fortuna, Lake Orion, MI (US)

(73) Assignee: Sulzer Metco (US), Inc., Westbury, NY (US)

( * ) Notice: Subject to any disclaimer, the term of this patent is extended or adjusted under 35 U.S.C. 154(b) by 0 days.

(21) Appl. No.: 11/480,961

(22) Filed: Jul. 6, 2006

(65) Prior Publication Data

US 2008/0006676 A1    Jan. 10, 2008

(51) Int. Cl.
*B23K 31/02* (2006.01)
*C22C 38/18* (2006.01)

(52) U.S. Cl. ............. 228/248.1; 228/183; 228/245; 420/34

(58) Field of Classification Search ............. None
See application file for complete search history.

(56) References Cited

U.S. PATENT DOCUMENTS 4,586,957 A * 5/1986 Masumoto et al. ......... 420/42
2003/0200835 A1 * 10/2003 Malie et al. ............... 75/354
2004/0184945 A1 * 9/2004 Sjodin ...................... 420/42
2006/0090820 A1 * 5/2006 Rabinkin et al. .......... 148/403

FOREIGN PATENT DOCUMENTS

| EP | 1 347 859 B1 | | 11/2001 |
| JP | 59-126739 | * | 7/1984 |
| JP | 2002144080 A | * | 5/2002 |

* cited by examiner

*Primary Examiner*—Kiley Stoner
(74) *Attorney, Agent, or Firm*—Hogan & Hartson LLP

(57) ABSTRACT

Brazing filler metal compositions have excellent wettability to nickel/cobalt/iron-based base metals and produce braze joints with high strength and heat/corrosion resistance. The iron-based braze filler metal includes chromium in amounts between about 20 to 35 percent by weight, silicon in amounts between about 3 to 12 percent by weight, phosphorus in amounts between about 3 to 12 percent by weight; and 0 to about 0.2 weight percent of one or more of calcium, yttrium and misch metal, the balance being iron. These filler metals are suitable for the manufacture of several different types of heat exchangers and catalytic converters at a significantly lower cost compared to currently known braze filler metal compositions.

6 Claims, 1 Drawing Sheet

IRON-BASED BRAZE FILLER METAL FOR HIGH-TEMPERATURE APPLICATIONS

CROSS REFERENCE TO RELATED APPLICATIONS

Not Applicable.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The present invention relates to iron-based braze filler metal compositions. More specifically, these filler metals are suitable for the manufacture of several different types of heat exchangers and catalytic converters at a significantly lower cost compared to currently known braze filler metal compositions.

2. Description of Related Art

Nickel-based brazing filler metals with a high chromium content are generally used for their corrosion- resistant and heat-resistant properties. For example, nickel-based fillers may be used in the fabrication and repair of equipment and parts required to operate under high-temperature, corrosive, and/or harsh environment. More particularly, nickel-based or cobalt-based braze filler metals can be used for certain types of heat exchangers, such as exhaust gas regulation (EGR) coolers in automotive applications. Filler metals for these applications must have certain properties to be suitable for use. Such properties include resistance to high temperature oxidation; corrosion resistance; good wettability to the base metals; and not causing embrittlement of base metals during brazing.

Several different grades of nickel-based braze filler metals are defined by the American Welding Society (ANSI/AWS A 5.8) standard. Many of these filler metals are used in the fabrication of heat exchangers. For example BNi-2, a nickel-based brazing filler with a nominal composition of Ni-Bal, Cr-7, B-3, Si-4.5, Fe-3 is a well known filler metal capable of producing braze joints with high strength. A major disadvantage of this filler metal is the degradation of the strength of the base metal due to boron diffusion into the base metal (especially in thin sheet metals as in heat exchangers) and erosion of the base metal. Other boron-containing nickel-based filler metals (such as, for example, BNi-1, BNi-1A, BNi-3, BNi-4 and BNi-9) have similar disadvantages due to the high amounts of boron of nearly 3 percent.

In order to overcome the disadvantages of boron diffusion, other alloys without boron have been considered. These were BNi-6 (Ni-10P), BNi-7 (Ni-14Cr-10P) alloys. These alloys contained approximately 10 percent phosphorus and produced joints without the required strength due to brittle phases in the joint. Another boron-free nickel-based braze alloy is BNi-5 (a Ni-Bal; Cr-19, Si-10). While these alloys were excellent in producing joints without the deleterious effect of boron diffusion into the base metal, there were other disadvantages.

U.S. Pat. Nos. 6,203,754 and 6,696,017 teach nickel-based filler metals of the type Ni—Cr—Si—P compositions that meet several of the requirements for brazing heat exchangers and have excellent corrosion resistance. However, a major disadvantage for these and all the above nickel-based filler metals is the high amount expensive nickel content. These alloys contain a minimum of at least 60 percent nickel. More typically they contain nickel in the range of 70 to 90 percent. The nickel content in these alloys increase the cost of braze filler metals and thus increase the cost of the heat exchangers to unattractive levels. Additionally, the supply of nickel raw material in the world market is volatile, and therefore prices are subject to escalation in an unpredictable manner.

Thus, in light of the factors described above, there remains a need in the art for a brazing filler material that meets the specific requirements for heat exchanger environments while eliminating boron diffusion and achieving lower costs.

SUMMARY OF THE INVENTION

This invention relates to brazing filler metal compositions that have excellent wettability to nickel-, cobalt-, and iron-based base metals; that produce braze joints with high strength and heat/corrosion resistance; and are significantly lower in cost compared to nickel-based filler metals. More specifically, these filler metals are suitable for the manufacture of several different types of heat exchangers and catalytic converters at a significantly lower cost compared to currently known braze filler metal compositions.

The typical uses for the above braze filler metals will be components that are exposed to high temperatures. Examples of these applications are several types of heat exchangers (plate and tubular types) that are used in exhaust recirculation in automotive applications. Similar uses are also expected in automotive and commercial emission devices such as catalytic converters. These applications will require the braze alloy to withstand high temperatures and also resist corrosion to sulfuric acid condensates.

The above objects of the invention are provided in a braze filler metal alloy with the following composition:

chromium—about 20-35 weight percent;
silicon—about 3-12 weight percent;
phosphorus—about 3-12 weight percent; and
a balance of iron, incidental ingredients, and trace impurities.

The alloy may optionally contain nickel (Ni) (up to 25 percent); molybdenum (Mo) (up to 5 percent); vanadium (V) (up to 5 percent); and one or more of aluminum (Al), calcium (Ca), yttrium (Y), or misch metal (up to a total of 0.2 percent).

The invention provides a method of making a powder of iron-based braze filler metal that includes the steps of providing a homogeneous alloy of about 20-35 weight percent chromium, about 3-12 weight percent silicon, about 3-12 weight percent phosphorus, and a balance of iron, incidental ingredients and impurities; and using an atomization process to form and collect powder particles from the homogeneous alloy. Powders from the above method can also be converted to a braze paste or a transfer tape by conventional methods.

The above braze filler metals in powder, paste or tape forms may be used in the manufacture of heat exchangers by a furnace brazing method. Thus, the invention also provides a method of forming a strong, corrosion-resistant braze joint, that includes a step of providing a first surface and a second surface to be joined. Another step includes applying a brazing filler metal to a desired location between the first and second surfaces, wherein the brazing filler metal comprises a homogeneous alloy of about 20-35 weight percent chromium, about 3-12 weight percent silicon, about 3-12 weight percent phosphorus, and a balance of iron, incidental ingredients and impurities. A subsequent step of the method includes furnace brazing the brazing filler metal and said first and second surfaces at a temperature above the melting point of said brazing filler metal. The brazing filler metal can be applied to the first and second surfaces in the form of one or more of a powder, a braze paste, and transfer tape.

One aspect of the present invention is to provide braze filler metals at a significantly lower cost compared to nickel-based braze filler metals for high volume commercial applications. Another aspect of the invention is to provide braze filler metal compositions that can be successfully used in the fabrication of catalytic converters or heat exchangers. It is a further aspect of this invention to provide braze filler metal compositions that have melting points lower than 1200° C. and have excellent wettability to stainless steel base metals. The invention also provides braze filler metals that have excellent resistance to corrosion and heat resistance.

Yet another aspect of this invention is to provide braze filler metals that have significantly reduced amounts of nickel. Another aspect of the invention is to provide the above-described filler metals in powder, tape, paste, or other useful forms to enable brazing of heat exchanger components and catalytic converters. Finally, it is another aspect of this invention to provide a method of brazing heat exchangers and catalytic converters at a significantly reduced cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
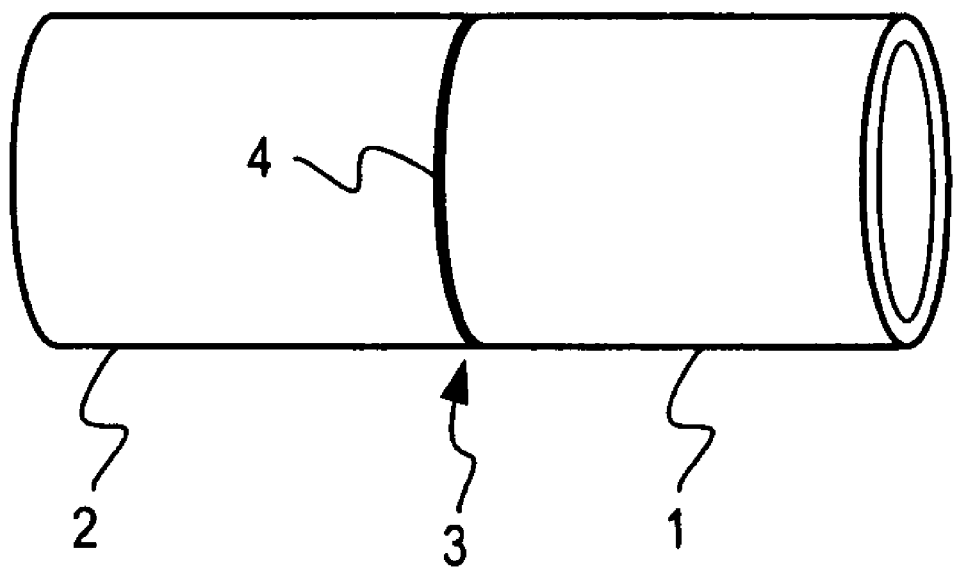
FIG. 1 provides an example of a brazed joint in a typical application.

Reference will now be made in detail to the preferred embodiments of the present invention, examples of which are illustrated in the accompanying drawings.

FIG. 1 provides an illustration of a typical application of a brazed joint for use with a filler material of the present invention. A first metal piece 1 and a second metal piece 2 are connected at brazed joint 3. Joint 3 is formed using an iron-based braze filler metal 4 in accordance with the present invention. The brazed joint may be part of an EGR cooler in a high-temperature cycling environment, such as an EGR cooler in automotive applications.

In order to achieve the above required heat and corrosion resistance, the braze filler metals generally have a chromium content in the range of about 20 to 35 weight percent. If the chromium content is less than about 20 percent, the required corrosion resistance will be reduced, and if the chromium content exceeds about 35 percent, the alloy could loose joint strength and/or brazeability.

Phosphorus and silicon contents are melting point depressants. Excess amounts of these elements increase the brittleness of the joints, but there must be enough of these elements to help reduce the melting point to around 1100° C. Therefore, the amount of phosphorus and silicon will each generally not exceed about 12 percent, with more typical amounts of these elements are phosphorus between about 3 to 8 percent and silicon between about 3 to 8 percent.

Several other elements are also useful as oxygen getters. These are aluminum (Al), calcium (Ca), yttrium (Y), and/or misch metal. Any of these elements could optionally be used individually or in combination up to a maximum of about 0.2 percent.

The braze filler metals predominantly contain iron as the main element. However in practice, it may be necessary to include a small amount of nickel to accommodate raw material considerations. In those instances nickel may be included up to about 25 percent. Other optional elements such as molybdenum or vanadium may also be included up to 5 percent each for special performance requirements, such as, for example, for improved resistance to acids.

Braze filler metal alloys may be provided in powder form. Powder formation for the filler material in accordance with the present invention may be accomplished using methods known in the art. For example, powders having the above composition may be made by melting a homogeneous alloy and converting them to a powder by an atomization process. Powder particle sizes can range between 150 microns and 10 microns, with typical sizes of 100 microns to 10 microns for heat exchanger applications.

The above powders can also be converted to a braze paste or a transfer tape by conventional methods. For example, brazing paste may be formed by mixing powder of a composition described above with a binder material. Transfer tape, for example, may be formed by combining powder of the above-described composition with an adhesive backing. The above braze filler metals in powder, paste or tape forms may be used in a furnace brazing method to manufacture corrosion-resistant joints in, for example, heat exchangers and catalytic converters.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. An iron-based braze filler alloy comprising:
   chromium in an amount of about 25-35 percent by weight;
   silicon in an amount of about 3-12 percent by weight;
   phosphorus in an amount of about 3-12 percent by weight;
   at least one of calcium, yttrium and misch metal in an amount of greater than 0 up to about a total of 0.2 percent by weight;
   nickel in an amount of up to about 25 percent by weight;
   at least one of molybdenum and vanadium in an amount up to about 5 percent by weight for each element; and
   a balance of essentially iron.

2. The iron-based braze filler metal according to claim 1, wherein the chromium is in an amount of about 28-30 percent by weight; the silicon is in an amount of about 3-8 percent by weight; and the phosphorus is in an amount of about 3-8 percent by weight.

3. A method of making a powder of iron-based braze filler metal comprising the steps of:
   providing a homogeneous alloy of about 20-35 weight percent chromium; about 3-12 weight percent silicon; about 3-12 weight percent phosphorus; greater than 0 to about 0.2 weight percent of one or more of calcium, yttrium and misch metal; and a balance of iron, incidental ingredients and impurities; and using an atomization process to form and collect powder particles from the homogeneous alloy.

4. A method of forming a strong, corrosion-resistant braze joint, said method comprising:

providing a first surface and a second surface to be joined;

applying a brazing filler metal to a desired location between said first and second surfaces, wherein said brazing filler metal comprises a homogeneous alloy of about 20-35 weight percent chromium; about 3-12 weight percent silicon; about 3-12 weight percent phosphorus; greater than 0 up to about a total of 0.2 weight percent of one or more of calcium, yttrium and misch metal; and a balance of iron, incidental ingredients and impurities; and furnace brazing said brazing filler metal and said first and second surfaces at a temperature above the melting point of said brazing filler metal.

5. The method of claim 4, wherein said brazing filler metal is applied in the form of one or more of powder, braze paste, and transfer tape.

6. The method of claim 4, wherein said first and second surfaces are parts of one or more of a heat exchanger and a catalytic converter.

* * * * *